(12) United States Patent
Bissinger et al.

(10) Patent No.: US 8,516,770 B2
(45) Date of Patent: Aug. 27, 2013

(54) ASSEMBLY OF A FIXED PANE ON A CAR BODY FLANGE AND FASTENING CLIP FOR MOUNTING OF THE FIXED PANE

(75) Inventors: Rainer Bissinger, Besigheim (DE); Erich Herbst, Besigheim (DE); Guido Knupfer, Abstatt (DE); Joachim Scheufler, Neunstein (DE)

(73) Assignee: Richard Fritz GmbH & Co. KG, Besigheim (DE)

( * ) Notice: Subject to any disclaimer, the term of this patent is extended or adjusted under 35 U.S.C. 154(b) by 676 days.

(21) Appl. No.: 12/460,740

(22) Filed: Jul. 23, 2009

(65) Prior Publication Data

US 2010/0024328 A1 Feb. 4, 2010

(30) Foreign Application Priority Data

Jul. 23, 2008 (DE) .................. 10 2008 034 400

(51) Int. Cl.
*E04C 2/38* (2006.01)
(52) U.S. Cl.
USPC ...... 52/716.6; 52/208; 52/718.05; 296/96.21; 296/146.15; 296/201
(58) Field of Classification Search
USPC ........... 52/208, 716.6, 716.7, 718.04–718.06; 296/146.15, 201, 84.1, 96.21
See application file for complete search history.

(56) References Cited

U.S. PATENT DOCUMENTS

| | | | | |
|---|---|---|---|---|
| 2,367,657 A * | 1/1945 | Boersma | | 52/511 |
| 3,037,596 A * | 6/1962 | Fordyce | | 52/511 |
| 4,591,203 A * | 5/1986 | Furman | | 296/201 |
| 4,611,850 A * | 9/1986 | Fujikawa | | 296/201 |
| 4,700,525 A * | 10/1987 | Nieboer et al. | | 52/698 |
| 4,805,363 A * | 2/1989 | Gold | | 52/208 |
| 5,027,569 A * | 7/1991 | Keys | | 52/208 |
| 5,142,834 A * | 9/1992 | Laclave et al. | | 52/208 |
| 5,639,522 A * | 6/1997 | Maki et al. | | 428/31 |
| 5,695,236 A * | 12/1997 | Banno et al. | | 296/96.21 |
| 5,707,473 A * | 1/1998 | Agrawal et al. | | 156/245 |
| 6,209,946 B1 * | 4/2001 | Eng | | 296/146.15 |
| 6,263,627 B1 * | 7/2001 | Schonenbach et al. | | 52/208 |
| 6,347,491 B1 * | 2/2002 | Legrand | | 52/204.62 |
| 6,378,931 B1 * | 4/2002 | Kolluri et al. | | 296/146.15 |
| 7,073,230 B2 * | 7/2006 | Boville | | 24/297 |
| 7,547,061 B2 * | 6/2009 | Horimatsu et al. | | 296/187.03 |
| 7,959,214 B2 * | 6/2011 | Salhoff | | 296/146.7 |
| 2002/0043041 A1 * | 4/2002 | Yoyasu | | 52/716.5 |
| 2002/0064435 A1 | 5/2002 | Sbongk | | |

FOREIGN PATENT DOCUMENTS

| | | | |
|---|---|---|---|
| DE | 33 33 672 A1 | | 4/1985 |
| DE | 3333672 A1 | * | 4/1985 |
| DE | 37 07 595 A1 | | 9/1988 |
| DE | 102 14 605 C1 | | 6/2003 |
| DE | 103 28 692 A1 | | 1/2005 |

(Continued)

*Primary Examiner* — Brian Glessner
*Assistant Examiner* — Adriana Figueroa
(74) *Attorney, Agent, or Firm* — Kriegsman & Kriegsman

(57) ABSTRACT

The invention relates to an assembly of a fixed pane on a car body flange and to a fastening clip for mounting the fixed pane which has a molding arranged on the pane circumferential edge and wherein on the molding at least one retaining member facing towards the body flange is provided for accommodating said fastening clip before the fastening clip for mounting the pane to the body flange is fixed in an insertion through-hole of the body flange in an automatically locking manner.

13 Claims, 3 Drawing Sheets

(56) References Cited

FOREIGN PATENT DOCUMENTS

| | | | |
|---|---|---|---|
| FR | 2577483 A1 * | 8/1986 | |
| JP | H03 25323 U | 3/1991 | |
| JP | H04 16016 U | 2/1992 | |

* cited by examiner

ASSEMBLY OF A FIXED PANE ON A CAR BODY FLANGE AND FASTENING CLIP FOR MOUNTING OF THE FIXED PANE

CROSS-REFERENCE TO RELATED APPLICATIONS

The present application claims priority under 35 U.S.C. 119 of German Application No. 10 2008 034 400.1, filed Jul. 23, 2008, which is incorporated herein by reference.

BACKGROUND OF THE INVENTION

The invention relates to an assembly of a fixed pane on a car body flange and to a fastening clip for mounting a fixed pane on a body flange.

An assembly relating to a fixed pane on a body flange of a motor vehicle in which the pane is provided with an injection-molded part extending around a circumferential edge of said pane (and referred to hereinafter by the term 'molding') is known from DE 33 33 672 A1. At an inner surface of the pane, a fastening clip is provided on the molding and is integrally connected to the molding by ultrasonic welding. This fastening clip may be arranged in an insertion through-hole provided in the body flange. In order to fix the fastening clip, which is formed as an expansion clip, on the body flange, an expansion pin is inserted from the interior side of the body so as to fix the fastening clip, shaped as an expansion clip, undetachably with respect to the insertion through-hole. This needs to be done before a vehicle interior trim panel can be applied which covers the fastening assembly.

This assembly has the disadvantage that several manipulation operations, or working steps, are necessary in order to mount a fixed pane on a body flange. In addition, this implies an unalterable sequence of execution of the various mounting steps for the vehicle interior during the fabrication process of a vehicle.

The fastening clip used for this assembly has the disadvantage that for one thing it is necessary to provide a specifically configured base portion for forming an ultrasonically welded connection with the molding, and that the fabrication of such a positive engagement is expensive. Moreover, an additional expansion pin is required in order to fix the fastening clip in the insertion through-hole of the body flange in a retaining position.

SUMMARY OF THE INVENTION

Therefore, it is an object of the invention to propose an assembly of a fixed pane on a body flange and a fastening clip for the mounting of a fixed pane on a body flange, said assembly using a small number of component parts and permitting an insertion of the fixed pane exclusively from the outside by placing it onto the body flange, so that it is not necessary to perform any further handling on an interior side of the body flange.

This objective is achieved, according to the present invention, by means of an assembly having the characteristics of claim 1 and of a fastening clip having the characteristics of claim 10. Other advantageous configurations and developments are mentioned in the respective dependent claims.

Due to the assembly, according to the present invention, of a fixed pane on a body flange by means of a fastening clip, which, prior to being mounted to the pane, may be arranged on the body flange on a retaining member that is provided on a molding surrounding the pane to be mounted, it is possible that once the pane to be inserted has been positioned relative to a body opening, or relative to the body flange surrounding said body opening, the movement of simply pushing the pane into place is sufficient for the fastening clips to become fixed within their respective insertion through-holes on the body flange. Once inserted into the insertion through-hole of the body flange, the fastening clip assumes an automatically locking position, so that the pane is fixed on the body flange without any additional, further measures being necessary. Thus, mounting the fixed pane with respect to the body flange is not only easy but can, in addition, be performed independently from individual assembly operations in the interior of the vehicle.

According to a preferred configuration of the invention, the fastening clip is provided with at least one locating member which, once the pane has been pushed into place or slid onto the retaining member of the molding, at least partially abuts on the retaining member or engages with the retaining member. Thus it is possible for the fastening clip to be immediately mounted in the circumferential zone of the pane and arranged there in a self-locking manner once the molding has been fabricated, such that a preassembled pane may be provided, ready for delivery and for being mounted to a body flange.

Preferably, the at least one locating member of the retaining member is designed to be capable of being moved into an engagement position, once the fastening clip has been positioned within the insertion through-hole of the body flange, such that an accidental detaching of the fastening clip from the retaining member is prevented. Due to the configuration of the retaining member, on the one hand, and of the fastening clip, on the other, the fastening member is caused to be forcibly locked in position with respect to the retaining member, once the pane has been mounted to the body flange, thus ensuring an engagement of the at least one locating member of the fastening clip with the retaining member. Thus, an accidental detaching of the pane is prevented. At the same time, the fastening clip abuts on the body flange and snaps into an automatically locking position. Thus the fastening clip assumes a double retaining function, permitting on the one hand a simple mounting of the pane with respect to the body flange and, on the other hand, a simple fixation of the clip on the molding of the pane.

The molding of the pane is preferably designed to have a reception zone which surrounds the retaining member and on which, or in which, a base portion of the fastening clip may be arranged, a fastening surface facing towards the body flange being preferably provided flush, or recessed, with respect to a circumferential surface adjoining the reception zone. Thus it is possible to achieve a structure for a fastening assembly having a limited height of construction. In addition, this may permit further positional stability of the fastening clip with respect to the molding. Furthermore, be it with the flush arrangement of the fastening surface on the base portion with respect to the circumferential surface surrounding the reception zone, or with a recessed arrangement of the fastening surface on the base portion with respect to the circumferential surface surrounding the reception zone, the molding is in either case designed to abut on a zone of the body flange adjoining the insertion through-hole. This may permit an additional sealing effect and/or a vibration-damping assembly or an oscillation-absorbing mounting of the pane with respect to the body flange.

According to a further preferred configuration of the assembly, the fastening clip is designed to have a sleeve-shaped main body on which at least one resilient, small arm facing outwards with respect to a retaining portion is provided. In the first embodiment, a round, sleeve-shaped main body is provided in which the arms are radially outward-facing and resilient in a radial direction. This configuration of the at least one radially outward-facing arm makes it possible to achieve the automatically locking assembly of the fastening clip on the body flange. During the mounting operation, the resilient arm, which may be formed in an elastic, spring-like manner, may be moved towards the main body, such that a simple insertion of the fastening clip is made possible. Subsequently, the resilient arms are restored to their initial positions and become engaged with the insertion through-hole from behind, such that the arms abut on an inner surface of the body flange. The same holds true, by analogy, for another embodiment in which a square, or rectangular, sleeve-shaped main body is provided. The arms are equally formed in a resilient manner with respect to the side surface.

Furthermore, the free end of the arm is designed to be provided at a distance from the base portion that corresponds at least to the thickness of the body flange surrounding the insertion through-hole. This enables the arms to be automatically restored to a locking position after the fastening clip has been inserted into the insertion through-hole.

Furthermore, the circumferential surface of the reception zone for the fastening clip on the molding is designed to abut at least partially on an outer surface of the body flange, and the at least one arm of the fastening clip is designed to be supported with at least a small amount of bias on an inner surface of the body flange, when the pane is in a mounted condition. Thus, a safe assembly of the fixed panes with respect to the body flange may be assured. For this purpose, the fastening surface of the base portion of the fastening clip is preferably arranged in a recessed manner with respect to the circumferential surface. During the mounting operation of the fixed pane, a short pressure increase is performed after the insertion of the fastening clip in order to compress the molding abutting on the outer surface of the body flange within an elastic range, such that the arms of the fastening clip may be restored to an initial position in order to abut in a locking manner on the inner surface of the body flange.

According to a further preferred configuration of the invention, the retaining member for the reception of the fastening clip is formed in the form of a spike or pin. This enables the sleeve-shaped main body of the fastening clip to be placed in an easy manner onto the retaining member for fixation thereon.

Furthermore, the retaining member is preferably designed to be integrally formed with the molding. This permits an easy fabrication, since the retaining member may be formed in one injection-molding operation together with the molding in the area of the pane circumferential edge.

The objective is further achieved, according to the present invention, by means of a fastening clip for mounting a fixed pane on a body flange, in particular for the assembly of the pane with respect to the body flange, which fastening clip is provided with a sleeve-shaped main body having a radially outward-facing base portion and, at a distance from the base portion, at least one arm facing outwards with respect to the main body and resilient in a radial direction, which form a first fastening device, and at least one radially inward-facing locating member provided on the inner circumference of the sleeve-shaped main body, which forms a second fastening device. Thus it is possible for the fastening clip to be inserted as a connecting member or coupling member between a molding and a body flange and to receive both parts in a fixedly defined position relative to each other. The first and second fastening devices are configured relative to each other in such a way that preferably each individual sliding movement leads to a corresponding fixation, respectively. The first fastening device permits a positioning of the pane with respect to the body flange after the fastening member has been inserted into an insertion through-hole of the body flange. The second fastening device permits at least a simple preparatory fixation of the fastening clip on a retaining member of the molding prior to the fastening of the pane on the body flange.

According to a preferred configuration of the fastening clip, the at least one arm and the at least one locating member are provided with insertion bevels which have opposite directions of action with respect to each other, i.e. which are inclined in opposite directions. This permits to first slide the fastening clip in an easy manner onto the retaining member of the molding and then to perform an insertion movement pushing the fastening clip onto the body flange in an easy manner.

According to a further preferred configuration of the invention, the sleeve-shaped main body is designed to have at least two preferably mirror-inverted halves, which are connected on the head portion by means of a preferably land-shaped articulation. This configuration makes it possible that the two halves may widen about their articulation, such that during the movement of sliding the fastening clip onto the retaining member a slight expansion of the halves caused by the radially inward-facing locating members occurs. This facilitates the movement of sliding or placing the fastening clip. In addition, an outer circumferential surface of the retaining member is not damaged. Alternatively, four identical body portions may, for example, be provided, so that two opposing articulated portions, respectively, form a common pivot axis along which the halves, or the quarters, may open.

According to a further preferred configuration of the fastening clip, the locating members are designed to have a bead-like or barb-like cross-section. The bead-like configuration of the locating members causes a diameter reduction of a circumferential surface of the retaining member when the fastening clip is arranged in the insertion through-hole. Thus, a positive engagement or a friction-type engagement between the fastening clip and the retaining member is achieved. In the alternative embodiment, the barb-like locating members are designed to enter in engagement with the retaining member, clutching at an outer circumferential zone of the retaining member. Thus it is possible to achieve a higher tensile force between the fastening clip and the retaining member.

In another advantageous configuration of the fastening clip, a centering member adjoining the base portion and having an insertion bevel preferably oriented towards the head portion of the main body is preferably designed to be provided between two radially spaced-apart arms arranged on the sleeve-shaped main body. The centering member permits an alignment of the fastening clip and the retaining position of the molding, respectively, in order to achieve a reliable sealing between the pane and the body opening. In addition, this may also provide a uniform alignment of the pane with respect to the body opening. On each half of the main body, a centering member is preferably provided. Due to the clearance provided between the two halves of the main body—with the exception of the land-shaped articulation portion—and due to the at least slightly resilient material of the retaining member, an at least slightly elastically resilient assembly is provided, such that the centering members enable a reliable and positionally correct assembly.

Preferably in the case of the round, sleeve-shaped main body, the base portion of the fastening clip configured in accordance with the present invention is formed, at least in part, as a circumferential, annular collar which is provided on its outside, with a contact surface for positioning on the molding and is provided, on the opposite side, with a fastening surface facing towards the free end of the arm, with the distance between the fastening surface and the free end of the arm corresponding at least to the thickness of the body flange surrounding the insertion through-hole. Thus, a secure positioning of the fastening clip on the body flange as well as a simple structure of the fastening clip may be formed. The same holds true, by analogy, for the square or rectangular main body, the annular collar being substituted by outward-facing land portions.

The fastening clip of the present invention is preferably formed as an injection-molded plastic part. This permits a cost-effective fabrication, the configuration of the fastening clip making it possible to use an injection mold consisting of two parts.

BRIEF DESCRIPTION OF THE DRAWINGS

The invention, as well as other advantageous embodiments and developments thereof, will be described and explained in the following with reference being made to the examples shown in the drawings. The characteristics issuing from the description and the drawings may be applied according to the present invention either individually or as a plurality of features taken in any combination. In the drawings.

DETAILED DESCRIPTION OF THE INVENTION

Figure 1:
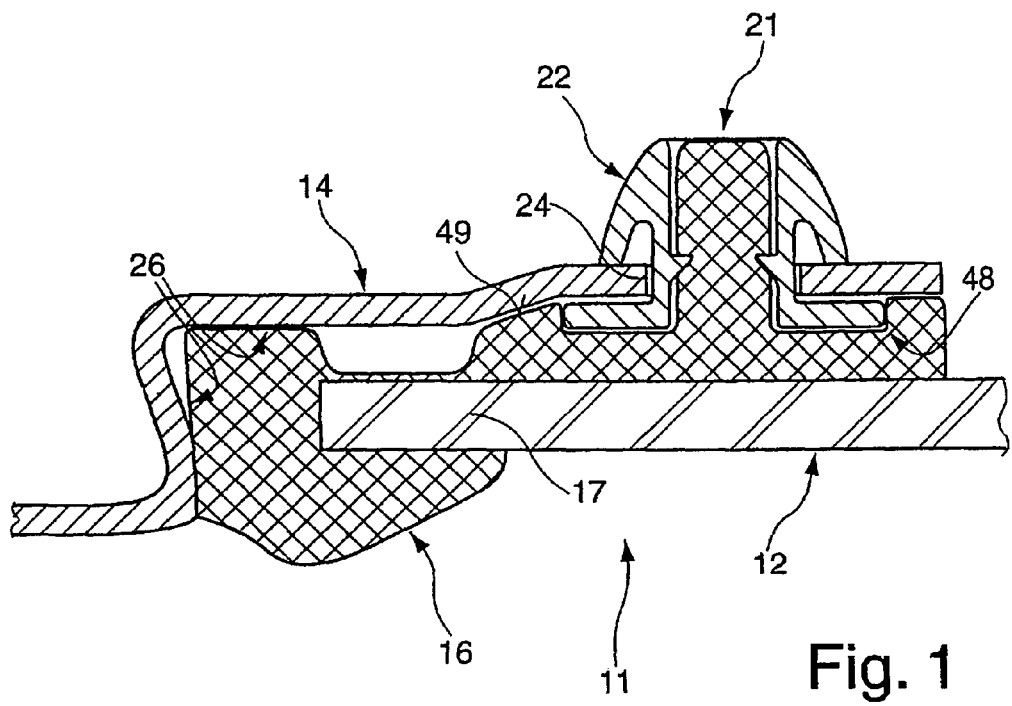
FIG. 1 is a schematic sectional view of the assembly according to the present invention of a fixed pane on a body flange.

FIG. 1 represents a schematic sectional view of the assembly 11, according to the invention, of a fixed pane 12 on a body flange 14 surrounding a body opening of a motor vehicle not represented in greater detail. The pane 12 is arranged on the body flange 14 in a sealing and close-fitting manner by means of a molding 16 which surrounds the pane circumferential edge 17. The pane 12 is preferably formed as a glass pane and may be inserted as a side window, a rear window and/or a windshield.

The molding 16 extending at least on an inner surface of the pane circumferential edge 17 of the pane 12 is provided with a retaining member 21. The retaining member 21 is preferably integrally formed with the molding 16. Alternatively, this retaining member 21 may also be formed separately and may be connected to the molding either by means of a snap-on connection or a clamping connection or by means of a material engagement such as bonding, or welding A fastening clip 22 is slid onto the retaining member 21. This fastening clip 22 is in engagement with an insertion through-hole 24 of the body flange 14, whereby the pane 12 is fixedly positioned on the body flange 14, and individual sealing portions 26 of the molding 16 are in contact with an outer surface of the body flange 14. The retaining member 21 preferably extends over the entire height of the fastening clip 22.

The mounting of the pane 12 on the body flange 14 is designed to be performed by first sliding the fastening clip 22 onto the retaining member 21 and then positioning this pre-assembled unit uniformly with respect to the body flange 14, before in the course of a further mounting step all of the fastening clips 22 provided on a molding 16 are inserted from the outside to the inside, into a respective insertion through-hole 24. After the insertion and positioning of the fastening clips 22 in the insertion through-holes 24 of the body flange 14 the fastening clip 22, and thus the pane 12, will automatically snap into place and become locked on the body flange 14, without any further measures being necessary.

The fastening clip 22 shown in the sectional view of FIG. 1, which is represented in a perspective view in FIG. 2, in a side view in FIG. 3, and in a top view in FIG. 4, will hereinafter be described in greater detail. The sectional view in FIG. 1 corresponds to a section along the line I-I in FIG. 4.

The fastening clip 22 has a sleeve-shaped main body 31 which comprises a base portion 32 and a head portion 33. The sleeve-shaped main body 31 is split into two halves by two clearances 34 opposing each other, the two halves being connected to each other in the area of the head portion 33 by means of a land-shaped articulation 36. Preferably, the two halves are arranged as mirror images of each other, the plane of mirror symmetry extending along the two opposed clearances 34. The sleeve-shaped main body 31 is exemplarily formed with a round sleeve. Alternatively, other geometries, such as square, rectangular, polygonal as well as oval or the like may be provided. On an inner circumference 37 of the sleeve-shaped main body 31, locating members 38 are provided which are directed radially inwards toward the longitudinal center axis 39 of the fastening clip 22. In the embodiment of the locating members 38 represented in FIGS. 1 to 4, said locating members comprise an insertion bevel 41 which preferably extends up to the barb-like locating member 38 and permits an easy sliding movement of the fastening clip 22 onto the retaining member 21 shaped in the form of a spike or pin. This is shown, for example, in FIG. 1. During the sliding movement of the fastening clip 22 onto the retaining member 21, the base portion 32 may at least slightly widen up due to the articulation 36, such that an easy placing and sliding is made possible. As the two halves of the base portions 32 are moved towards the retaining member 21, the at least one locating member 38 engages with the retaining member 21 and thus determines the position of the fastening clip 22 with respect to the retaining member 21.

On the outer periphery of the sleeve-shaped main body 31 small arms 42 facing radially outwards and resilient in a radial direction are provided, with their free ends 43 being directed towards a fastening surface 44 on the base portion 32. The base portion 32 is shaped in the form of an annular collar and made up of different sections. This configuration, consisting of different sections, has the advantage of permitting an easy fabrication of the fastening clip 22 as an injection-molded part. The base portion 32 has a contact surface 46 located on a side opposite to that of the fastening surface 44, which after the positioning of the fastening clip 22 abuts on the molding 16 in a reception zone 48 thereof (FIG. 1). The reception zone 48 of the molding 16 is configured in such a way that a fastening surface 44 is flush, or recessed, with respect to a circumferential surface 49 surrounding said reception zone 48.

Furthermore, the sleeve-shaped main body 31 of the fastening clip 22 is provided with at least one centering member 51 which has an insertion bevel 52. This insertion bevel 52 graduates into a centering surface 53 adjoining the fastening surface 44. Preferably, two opposing centering members 51 are provided for the alignment and positioning of the pane 12 with respect to the body flange 14.

In view of the insertion of the fastening clip 22 into the insertion through-hole 24, the arms 42 have insertion bevels 56 which have the same direction of action as the insertion bevel 52 of the centering member 51. As the fastening clip 22 is inserted into the insertion through-hole 24, the arms 42 are moved towards the sleeve-shaped main body 31. After the insertion movement is completed, the arms 42 are restored to their initial position and abut on an inner surface of the body flange 14 or, in other words, become engaged with the insertion through-hole 24 from behind.

Figure 4:
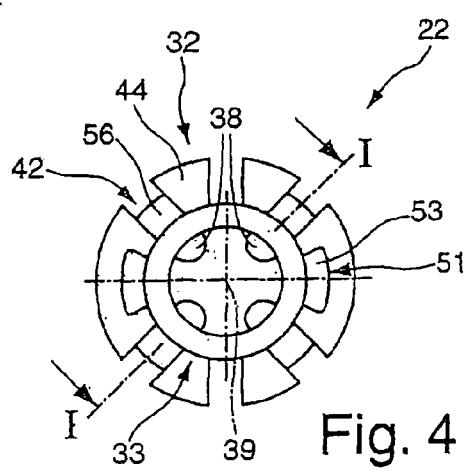
FIG. 4 is a schematic top view of the fastening clip according to FIG. 3.

FIG. 4 represents a preferred arrangement of the locating members 38 and of the centering member 51 on the respective half of the sleeve-shaped main body 31. The centering members 51 are preferably located centrally on an axis of the respective half of the sleeve-shaped main body 31. Thus, an almost simultaneous movement towards the longitudinal central axis 39 takes place from both sides after the insertion of the fastening clip 22 into the insertion through-hole 24, such that the locating members 38, four of which are preferably provided and spaced at regular intervals about the circumference, abut on the retaining member 21 or become engaged therewith. This permits the fastening clip 22 to be fastened to the retaining member 21 with a great deal of retaining force. In addition, the arms 42 arranged on the outside surface opposite the locating member 38 will cause the locating members 38 to be moved towards the retaining member 21 when a force is exerted on the arm 42 as the insertion into the insertion through-hole 24 is carried out, which causes the retaining force exerted on the retaining member 21 to be at least maintained.

Thus, the assembly, according to the invention, of a fixed pane 12 on a body flange 14 makes it possible to first slide the fastening clip 22 onto the retaining member 21 which is integrally formed with the molding 16, and to subsequently insert the fastening clip 22 into the insertion trough-hole 24. If prior to the insertion of the fastening clip 21 into the insertion through-hole 24 the locating members 38 are not yet completely in abutment or in engagement with the retaining member 21, said engagement is formed at the moment of inserting the fastening clip 22 into the insertion through-hole 24, as both the arms 42 and the centering surfaces 53 of the centering members 51 abut on the opening edge of the insertion through-hole 24, causing the locating members 38 to be forcibly brought into a fastening position. Once the fastening clip 22 has been inserted into the insertion through-hole 24, this will forcibly also cause the fixation of the fastening clip 22 to be maintained in the right location with respect to the retaining member 21. Due to this assembly, a simple and rapid mounting of a fixed pane 12 on a body flange 14 is made possible.

Figure 5:
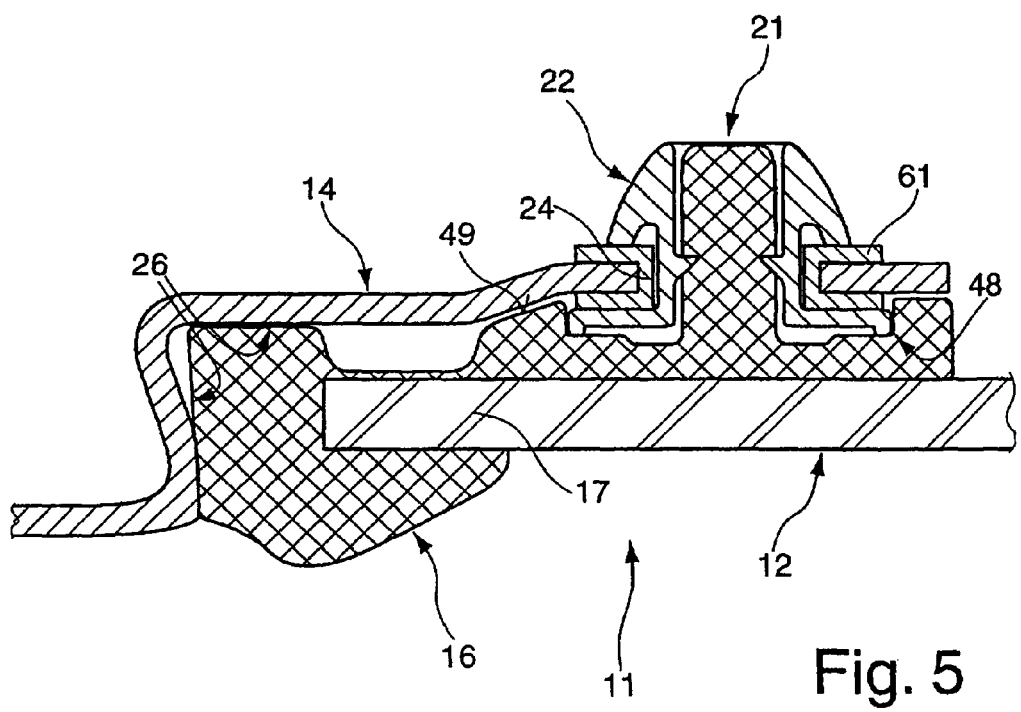
FIG. 5 is a schematic sectional view of an alternative assembly of a fixed pane on a body flange according to the present invention.

FIG. 5 represents a schematic sectional view of an alternative embodiment of the assembly 11 according to the invention, differing from that of FIG. 1. The embodiments and configurations described above are also true for this alternative embodiment, for which only the changes and alternatives are dealt with hereinafter.

Preferably, a sealing member 61 is inserted into the insertion through-hole 24, said sealing member surrounding at least the radial edge of the insertion through-hole. Preferably, the sealing member 61 has a circumferential groove which is open towards the outside, such that the sealing member 61 surrounds a top surface and a bottom surface of the body flange 14 in the circumferential area of the insertion through-hole 24. Thus, an additional sealing effect may be achieved. In addition, a decoupling of vibrations between the body flange 14 and the arms 42 of the fastening clip 22 may thus be achieved.

The fastening clip 22 represented in FIG. 5 exemplarily has an alternative configuration of the base portion 32. The contact surface 46 is merely formed as a circumferential land surface or a narrow annular surface. This assembly has the advantage that during the sliding movement of the fastening clip 22 the sleeve-shaped main body 31 may continue to be slightly pushed further down in the sliding direction after the contact surface 46 has established contact within the reception zone 48 of the molding 16 before the locating members 38, in a kind of elastic recovery movement, become completely engaged with the retaining member 21. Due to a lever arm formed by the constructive configuration of the base portion 32, a recovery movement is thus achieved, which causes the locating members 38 to become engaged with the retaining member 21 with increased force. Thus the force with which the locating members 38 become engaged and, consequently, the retaining force may be increased. Merely by way of example, a slight recess with respect to the circumferential region may be designed to be provided in a region of the reception zone 48 adjoining the retaining member 21, such that the application of said bias in the base portion 32 is facilitated.

Figure 2:
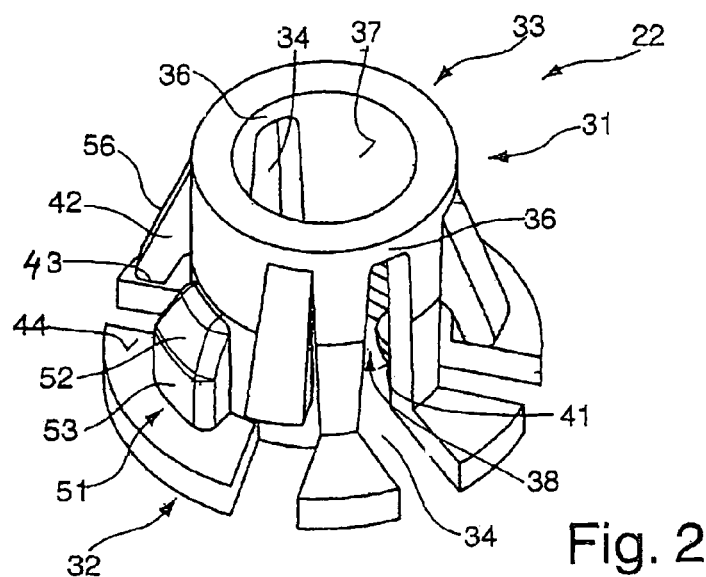
FIG. 2 is a perspective view of the fastening clip according to the present invention.
Figure 3:
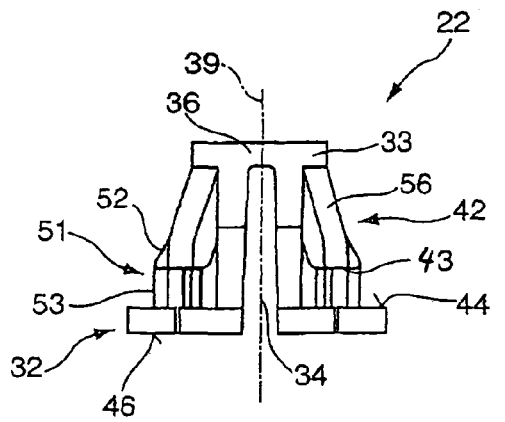
FIG. 3 is a schematic side view of the fastening clip according to FIG. 2.
Figure 6:
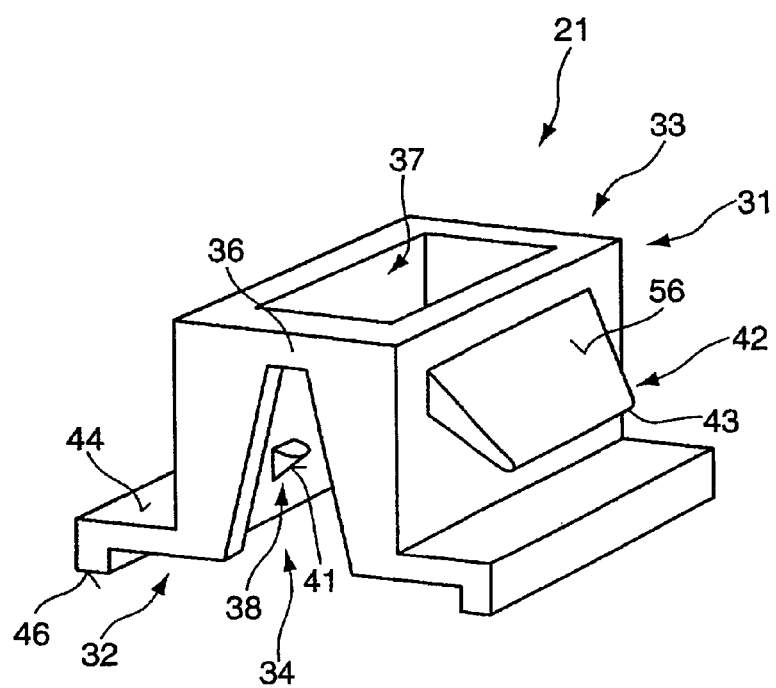
FIG. 6 is a perspective view of an alternative fastening clip according to the present invention.

FIG. 6 represents an alternative embodiment of a fastening clip 22, differing from that of FIGS. 2 to 4. The embodiments and alternatives described above are also true, by analogy, for the fastening clip 22 represented in FIG. 6. The latter deviates in the geometry of the sleeve-shaped main body 31. By way of example, a rectangular, sleeve-shaped main body 31 is provided. Alternatively, a square main body may be provided. Polygonal main bodies, such as hexagonal or octagonal main bodies, respectively, may equally be provided. The retaining members 21 are preferably adapted, as to their geometry, to the inner circumference of the main body 31.

In the case of the rectangular configuration of the sleeve-shaped main body 31, for example, two arms are sufficient, with their widths preferably extending over a large portion of the respective lateral surfaces. As an alternative to a single and very wide arm 42 two or more arms may be provided side by side on one sidewall. In addition, the number of arms on either sidewall may not be the same. For example, two arms spaced apart from each other may be provided on one sidewall and one arm may be provided on the opposite sidewall, said one arm being arranged at a location corresponding to the empty space between said two arms on the opposite sidewall.

The base portion 32 of the fastening clip 22 according to FIG. 6 is formed in the form of an outward-facing land portion which may have, for example, a narrow contact surface 46 shaped in the form of a strip or rib. This rib-shaped or strip-shaped contact surface 46 permits to achieve the same effect during the placing or sliding of the fastening clip 22 onto the retaining member 21 as has been described for the fastening clip 22 in FIG. 5. Due to the rectangular or square geometry of the sleeve-shaped main body 31, additional centering members may be eliminated, as a centering or an alignment may be achieved by the geometry of the main body of the fastening clip 22.

The invention claimed is:

1. An assembly of a fixed pane on a body flange in which the pane has a molding arranged on the pane circumferential edge and a fastening clip which connects the molding to the body flange, wherein the molding has at least one retaining member facing towards the body flange, the retaining member is shaped in the form of a spike or a pin, said fastening clip is arranged on the retaining member before the fastening clip for mounting the pane to the body flange is fixed in an insertion through-hole of the body flange in a self-locking manner, said fastening clip is provided with at least one locating member which, once the fastening clip has been placed or slid onto the retaining member of the molding, abuts at least partially on the retaining member, and the at least one locating member is capable of being moved into an engagement position with respect to the retaining member, wherein the fastening clip has a sleeve-shaped main body on which at least one resilient, small arm facing outwards with respect to the main body is provided, wherein a free end of the at least one arm is provided at a distance from a base portion of the fastening clip that corresponds at least to the thickness of the body flange surrounding the insertion through-hole, wherein a circumferential surface of the molding which adjoins a reception zone or sealing portions on the molding abuts at least partially on an outer surface of the body flange when the pane is in a mounted condition, and wherein when the pane is in a mounted condition at the least one arm of the fastening clip is supported on an inner surface of the body flange and the molding provided on the outer surface of the body flange, is abutting with at least a small amount of bias at least along individual sections of the molding on the body flange.

2. The assembly of claim 1, wherein once the fastening clip has been positioned in the insertion through-hole of the body flange, an accidental detaching of the fastening clip from the retaining member is prevented.

3. The assembly of claim 1, wherein the molding has a reception zone surrounding the retaining member in which the base portion of the fastening clip is arranged.

4. The assembly of claim 3, wherein the base portion of the fastening clip facing towards the body flange is provided flush or recessed with respect to a circumferential surface of the molding which adjoins the reception zone of the molding.

5. The assembly of claim 1, wherein the retaining member is integrally formed with the molding.

6. The assembly of claim 1, wherein the at least one arm and the at least one locating member are provided with insertion bevels which have opposite directions of action with respect to each other.

7. The assembly of claim 1, wherein the sleeve-shaped main body has at least two halves, which are connected by a head portion.

8. The assembly of claim 7, wherein the head portion comprises a bar-shaped articulation.

9. The assembly of claim 1, wherein the at least one locating member has a bead-like or barb-like cross-section.

10. The assembly of claim 1, wherein the at least one arm comprises two arms and wherein between the two arms arranged on the sleeve-shaped main body at least one centering member adjoins the base portion of the main body.

11. The assembly of claim 10, wherein the centering member is provided with an insertion bevel facing towards the head portion.

12. The assembly of claim 1, wherein the base portion is formed as an outward-facing bar portion, present at least along individual sections, which is provided, on its outside, with a contact surface for being supported on a molding and is provided, on the opposite side, with a fastening surface facing towards the free end of the at least one arm, the distance between the fastening surface and the free end of the at least one arm corresponding at least to the thickness of the body flange surrounding the insertion through-hole.

13. The assembly of claim 1, characterized in that said clip is formed as an injection-molded plastic part.

* * * * *